Dec. 21, 1943.  R. E. HINES  2,337,471
COLLET CHUCK
Filed Feb. 23, 1942
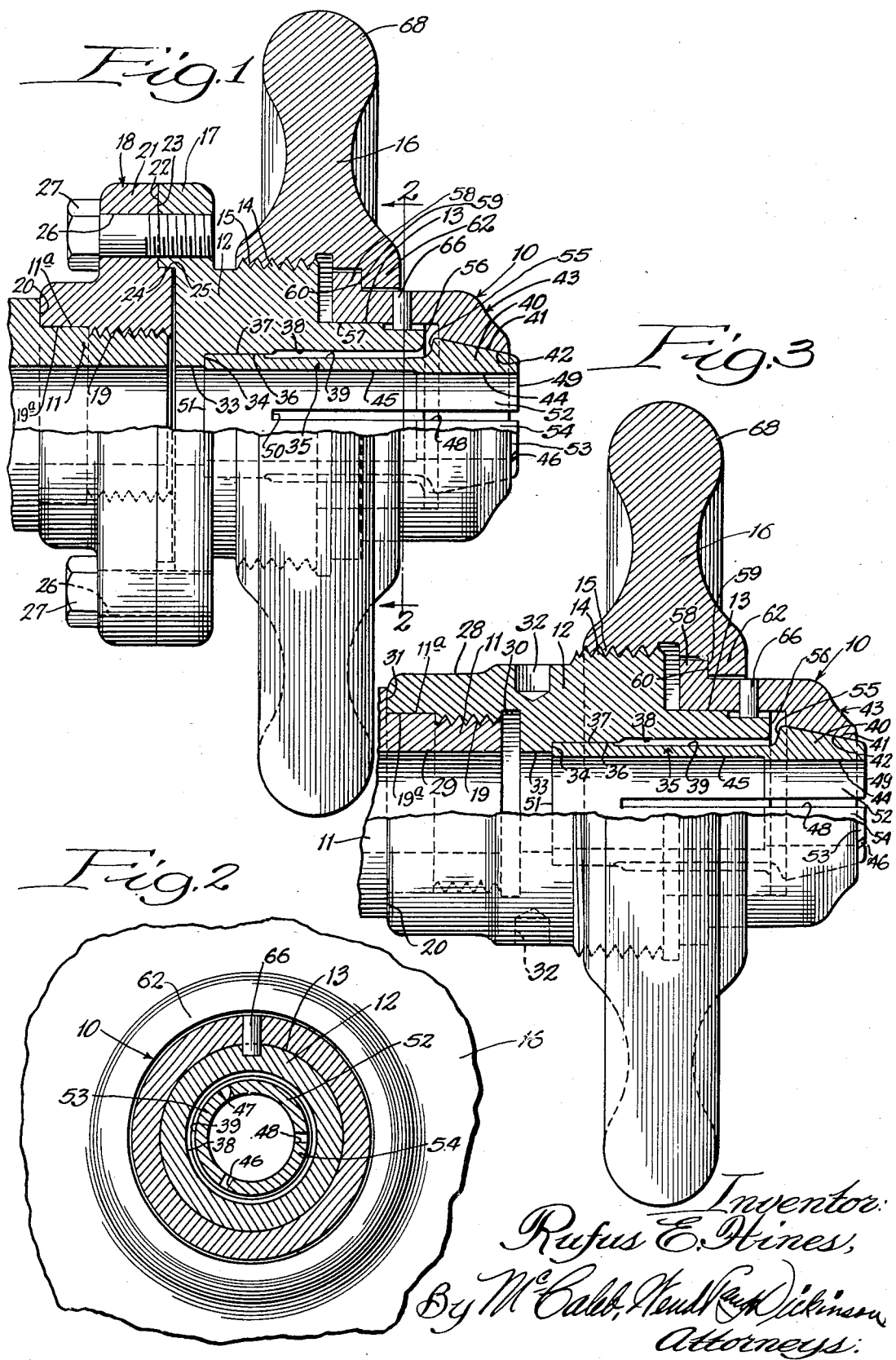
Inventor:
Rufus E. Hines,
By McCabe, Kendall & Dickinson
Attorneys.

Patented Dec. 21, 1943

2,337,471

UNITED STATES PATENT OFFICE 2,337,471

COLLET CHUCK

Rufus E. Hines, Chicago, Ill.

Application February 23, 1942, Serial No. 431,969

2 Claims. (Cl. 279—49)

The present invention relates to collet chucks, and is particularly concerned with the provision of an improved collet chuck for use with lathes or milling machines.

One of the objects of the invention is the provision of an improved collet chuck which is adapted to be tightened upon a bar or other member without drawing the collet either backward or forward in an axial direction so that when a bar is set to project a given distance it will be secured in the chuck in that position.

Another object of the invention is the provision of an improved collect chuck of the class described which is adapted to be tightened or released at the forward end of the spindle, which has a minimum amount of over-hang, thereby making the collet more rigid, and which is provided with a simple and effective means for actuating the collet.

Another object of the invention is to provide an improved collet chuck which is simple and rugged in construction, economical to manufacture, compact, and capable of being used for a long period of time without getting out of order and without undue wear on any of its parts.

Another object of the invention is the provision of an improved and simple collet chuck, the contracting elements of which are not likely to jam and fail to release, and the parts of which are so arranged that there is no part subjected to undue strains which it is incapable of withstanding.

Another object of the invention is to provide an improved collet chuck of the class described which is rigid in its action and adapted to have its parts manufactured with perfect concentricity at a low cost and which is adapted to release or to secure firmly the collet with a minimum amount of rotative movement of the hand wheel.

Other outstanding advantages of the present collet chuck may be briefly summarized as follows: First, the radial closing of the collet on the bar prevents intermediate pull or other axial movement of the collet as it grips the bar. Second, the non-rotation of the closing member with relation to the collet serves to prevent any rotative movement of the collet or bar. Third, as a result of the two foregoing features, the collet may be closed upon a bar without disturbing the axial or rotative position in which the bar has previously been set.

Other objects and advantages of the invention will be apparent from the following description and the accompanying drawing, in which similar characters of reference indicate similar parts throughout the several views.

Referring to the single sheet of drawings accompanying this specification,

Fig. 1 is a side elevational view in partial section of a collet chuck embodying the invention and mounted upon a chuck back for adapting it to any size of spindle nose;

Fig. 2 is a fragmentary sectional view, taken on the plane of the line 2—2 of Fig. 1, looking in the direction of the arrows;

Fig. 3 is a similar view of a modification provided with a chuck body threaded to fit a definite spindle nose, such as, for example, the spindle nose disclosed in the prior application, Serial No. 369,724, filed December 12, 1940, by Henry H. Logan and Oscar W. Lilliedahl on Headstock for lathes.

Referring to the drawing, 10 indicates in its entirety my improved collet chuck, which is shown in connection with the spindle nose of a lathe. The collet chuck 10, in the form of Fig. 1, is provided with a metal body 12, having an accurately machined round and polished outer cylindrical surface 13.

The chuck body 12 is of substantially cylindrical shape and is provided with external threads 14 for engagement with the internal threads 15 formed in the complementary bore of the hand wheel 16.

In the embodiment of Fig. 1 the body 12 is provided with a radially extending flange 17 at its rear end, the flange 17 being mounted upon a chuck back for adapting it to any size of spindle nose 11. The chuck back or adapter 18 comprises an annular member, having a threaded through bore 19 for receiving the threaded nose 11 of a lathe, upon which it is threaded until it engages the thrust surface 20.

The chuck back preferably has a radially extending flange 21 of the same size as the flange 17, and the flanges 17 and 21 have accurately machined annular surfaces 22 and 23, respectively, for engaging each other.

The body 12 is provided with a cylindrical recess 24 for receiving the outer cylindrical portion 25 carried by the chuck back 18 for the purpose of effecting an accurate centering of the chuck body on the chuck back. The chuck body and chuck back are provided with a plurality of regularly spaced through bores 26 for receiving the screw bolts 27 which pass through the chuck back and are threaded into the bore in the flange 17 of the body 12 to secure the chuck back and chuck together.

In the embodiment of Fig. 3 the chuck body 12 is provided with a substantially cylindrical extension 28, which has a threaded bore 29 for engagement with the threaded lathe nose 11.

In this case there is preferably a relief at 30 at the inner end of the bore 29, and the threads of the nose and threaded bore 29 have sufficient clearance so that the axial position of the chuck on the nose is determined by the firm engagement of the annular end surface 31 of the chuck body with the annular shoulder 20 on the chuck nose 11.

The spindle 11 and chuck body 12 are also provided with the complementary cylindrical surface 11A and closely fitting counterbore 19A, which effect an alignment and accurate centering of the chuck on the spindle.

The chuck body 12 may be provided with a plurality of regularly spaced cylindrical recesses 32 extending into the chuck body 12 and adapted to be engaged by a suitable tool for rotating the chuck and securing it on the lathe nose.

The chuck body 12 is preferably provided with a through bore 33 and with an inwardly extending radial flange having an annular shoulder 34 for engaging the inner end of the collet 35.

The chuck body 12 preferably has an accurately machined and ground cylindrical surface or counterbore 36 having an accurate fit with the outer machined and ground cylindrical surface 37 on that end of the collet. Either or both of the chuck body 12 and collet 35 are preferably relieved at 38, 39, comprising the major central portion of the body of the collet and the adjacent portion of the chuck so that the collet is free to move at this portion in its contraction and expansion to grip a bar or other member.

The collet 35 comprises a tubular metal member made of a suitable metal, such as steel, which is formed at its inner end with the accurate cylindrical surface 37, with a reduced cylindrical portion 39 intermediate its ends.

The frusto-conical enlargement 40 at its outer end has the exterior frusto-conical surface 41, which is substantially complementary to the inner frusto-conical surface 42 of the closing member 43.

The collet 35 is provided with an accurately machined and ground cylindrical bore 44 adjacent its forward end and with a slightly larger counterbore 45 at its rear end. The collet 35 also has a plurality, preferably three, equally spaced radially and axially extending slots 46, 47, and 48 extending from its forward end 49 longitudinally of the collet to a point 50 spaced from the inner end 51 of the collet.

Slots 46 to 48 are formed by the removal of material from the tubular body of the collet, and they extend through the wall and through the enlarged frusto-conical head 40. Thus the forward end of the collet comprises three jaw portions 52, 53, and 54, which are adapted to be bent radially inwardly to grip a bar or other member.

The rear edge 55 of the frusto-conical member 40 on the collet is preferably spaced from the front end 56 of the chuck body 12. The chuck body 12 has already been described as having an outer threaded surface 14 and accurately finished cylindrical surface 13. The latter surface 13 is for engagement with a complementary surface 57 on the inside of the closing member 43 at the rear end of the closing member.

Thus the closing member 43 is slidably mounted on the cylindrical surface 13. The closing member 43 comprises a tubular metal member preferably made of some suitable metal, such as steel, having an outwardly extending radial flange 58 at its inner end. The radial flange 58 has an annular thrust surface 59 on its right side for engagement with an oppositely disposed annular surface 60 carried by the hand wheel 16.

The hand wheel 16 is preferably provided with an annular rim 68, which may be circular in cross section, and which has no projecting parts, since it rotates with the chuck.

The operation of the chuck is as follows: The collet 35 rests against the shoulder 34 in the chuck body 12, and thus it cannot move axially as it is tightened. The chuck may be fully opened by turning the hand wheel 16 in a counterclockwise direction so that it moves toward the right on the threads 14 (Fig. 1). This permits the closing member 43 to move toward the right off the frusto-conical surface 41 and permits the collet to expand to its fully expanded position.

The cylindrical bar may then be placed in the collet, and the hand wheel 16 may be rotated in a clockwise direction to secure it in place. As the hand wheel is rotated it progresses toward the left on the threads 14 (Fig. 1); and annular flange 62, engaging the annular flange 58 on the closing member, draws the closing member axially toward the left on the chuck body 12.

Although the hand wheel rotates, the closing member is held against rotation by the pin 66. The closing member's frusto-conical inner surface 42 engages the outer frusto-conical surface 41 on the collet 35 and causes the jaw portions of the collet to be forced together against the bar in the chuck. Only a small amount of movement is required at the hand wheel to secure the bar in the chuck, and the bar is not moved axially, nor is it rotated from its set position. The collet is firmly supported in concentric position with respect to the lathe spindle, and there is very little wear on any of the parts of the chuck.

The present device is adapted to be constructed so that it is accurately concentric, with a minimum amount of labor, for the following reasons.

The alignment of the chuck body 12 on a spindle nose 11 depends upon the end surface 31, which engages the annular shoulder 20 and upon the threads 19. This end surface is made at right angles to the axis of the body 12, which is also the axis of the inner cylindrical surface 36 and the outer cylindrical surface 13. The threads are also cut concentrically to the same axis.

The closing member 43 is guided on the body 12 by an inner cylindrical surface 57, and it is a simple matter to make the frusto-conical surface 42 of the closing member 43 accurately concentric with respect to the inner cylindrical surface 57.

The collet has two surfaces, which are also concentric, the surfaces being the cylindrical surface 37 and the frusto-conical surface 41. These two surfaces are concentric to the inner cylindrical surface 45 of the collet. Thus a bar is adapted to be supported in accurately concentric position with respect to the axis of the lathe spindle.

Due to the radial closing of the collet on the bar and the non-rotation of the closing member with respect to the collet, the bar may be secured without any axial or rotative movement. There is a minimum amount of over-hang, and consequently the present chuck is adapted to support its bar very rigidly. The chuck has a minimum number of simple parts, and is capable of economical manufacture and less likely to get out of order than the more complicated designs of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A collet chuck comprising a chuck body, an actuating member, a closing member, and a collet, said collet being located in an axial bore in said body and comprising a tubular metal member slotted at its receiving end and having a frusto-conical member projecting from said body, said closing member having a complementary frusto-conical surface engaging said member and being telescoped with and slidably mounted on said body, and said actuating member having threaded engagement with said body and having thrust means engaging said closing member to draw the closing member on the body to tighten the collet, said bore having an abrupt annular shoulder and said collet engaging said shoulder in said body to prevent the axial movement of said collet as it is tightened, and guide means carried by said closing member and body for preventing relative rotation and permitting relative axial movement between said closing member and body whereby the collet is not rotated when it is tightened.

2. In a collet chuck, the combination of a chuck body having an axially extending bore provided with an inner annular shoulder, said body having an external threaded portion and an external cylindrical guiding portion of reduced size, and having an axially extending slot in said guiding portion, with a collet, said collet having a cylindrical through bore and having a frusto-conical external surface on its head, said collet having a plurality of longitudinally extending slots and having adjacent its head a bore of reduced cylindrical size for gripping the work, said collet also having an external cylindrical surface at its opposite end for engaging in said cylindrical bore in said body and having a shoulder at its inner end for engaging said annular shoulder, said collet and body having a clearance between the major portion of the outer surface of said collet and said body, and a closing member, said closing member having a cylindrical bore for engagement with the outer cylindrical surface on said body, and having a pin for engaging in said slot and preventing the rotation of said closing member, but permitting the sliding movement of said closing member, said closing member having at its outer end an inner frusto-conical surface of complementary shape to the frusto-conical surface on said collet, and said closing member having a radially extending annular flange at its inner end, and an actuating member comprising a rotatable wheel having an inner threaded bore for receiving the threaded portion of said body, and having an inwardly projecting annular shoulder extending inward in front of the annular flange on said closing member whereby said actuating member is adapted to move said closing member axially so that the frusto-conical surface on the closing member slidably engages the frusto-conical surface on the collet and contracts the collet at its head, the collet being held against rotation and axial movement by the thrust of the closing member on the collet against the annular shoulder in said body and by the closing member being held against rotation.

RUFUS E. HINES.